Aug. 21, 1956 G. R. COUANAULT 2,760,147

POTENTIOMETER CIRCUIT ARRANGEMENTS

Filed June 25, 1953

Inventor:
Georges René Couanault
Attorneys:
Baldwin & Wight

United States Patent Office

2,760,147

Patented Aug. 21, 1956

2,760,147

POTENTIOMETER CIRCUIT ARRANGEMENTS

Georges René Couanault, Vitry-sur-Seine, France, assignor to Societe Alsacienne de Constructions Mecaniques, Paris, France, a corporation of France Application June 25, 1953, Serial No. 364,126

Claims priority, application France July 15, 1952

3 Claims. (Cl. 323—74)

The present invention concerns electromechanical equipments such as analog computers, in which quantities are represented by electric voltages or by the position of mechanical members and, more particularly, of the sliding part of potentiometric resistances, hereafter called potentiometers.

Such potentiometers deliver electric voltages across their terminals, which depend upon the position of the slider. These potentiometers play an important part in the above equipments.

The present invention concerns electromechanical equipments in which a plurality of potentiometers are mounted in cascade; the current, which flows through the potentiometers, depends upon the position of the sliders and this introduces an error in the supplied voltage.

It has been very difficult, in practice, to manufacture potentiometers which would reduce this error to a negligible value since, on the one hand, the potentiometer which is at the origin of the cascade should have a minimum resistance so as not to go beyond the limits of its heating limit and, on the other hand, the potentiometer which is at the other end of the cascade is limited with regard to its maximum resistance on behalf of winding difficulties and of the presence of eddy phenomena.

It has already been proposed, in order to obviate such drawbacks, to replace the so called "resistive" potentiometer by an "inductive" potentiometer; but the latter has revealed to be a costly and bulky potentiometer.

The present invention has for its object to obviate such drawbacks, and it contemplates, when a plurality of potentiometers are mounted in cascade in an analog computer, using across the terminals of each of said potentiometers a conductive member the electric resistance of which is negative and close in absolute value to the electric resistance of the considered potentiometer.

It shall be proved hereafter that the value of the resistance, in each potentiometer, may thus be brought to a given value while no disturbing errors result therefrom.

According to the present invention, the member, the resistance of which is negative, is constituted by an amplifying double triode mounted so as to obtain a positive shunt feedback and a negative series feedback and conversely; the amplification factor and the overall slope of said amplifier are chosen in order that said negative resistance be independent of the parameters of said tubes.

Figure 1:
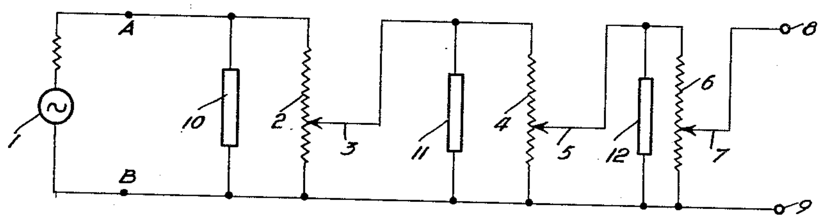
Figure 2:
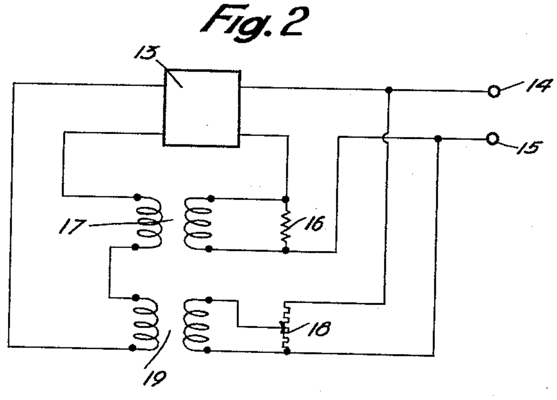
Figure 3:
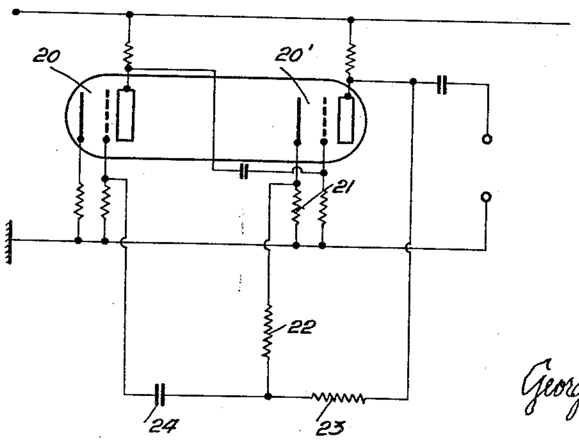

The invention is described more in detail hereafter with reference to the appended drawings, in which:

Fig. 1 diagrammatically shows potentiometers mounted in cascade with negative resistances across their terminals;

Fig. 2 is a diagram showing a negative resistance applied to potentiometers of an electromechanical equipment; and Fig. 3 is a diagram of an embodiment in which the negative resistance is constituted by an amplifying double triode with a series and a shunt feedback, respectively, negative and positive.

In Fig. 1, 1 is a generator, 2 4, 6, being potentiometers mounted in cascade. The voltage supplied by generator

1 may be controlled by the respective sliders 3, 5, 7 of said potentiometers and delivered across the output terminals 8, 9. Negative resistors 10, 11, 12 are respectively associated to the terminals of each potentiometer 2, 4, 6 the absolute value of each of said resistors being close to the value of the resistance of the corresponding potentiometer.

When considering this diagram representing a circuit with an electromotive force E and if $R_1$, $R_2$, $R_3$, are the resistances of the potentiometers across the terminals of each of which is respectively connected a negative resistance $-R_1$, $-R_2$, $-R_3$, approximately equal in absolute value to the resistance of the corresponding potentiometer and if U is the voltage across the input terminals of the dipole and $i_1$ and $i_2$ are the intensities through potentiometer 2 and resistor 10, $$i_1=\frac{U}{R_1} \qquad i_2=\frac{U}{-R_1}$$

The result is that $i_1+i_2=0$ and no current is supplied by the voltage supply U; the value of the resistance in each potentiometer may thus be of any value whatsoever without causing errors of the kind above referred to. Such a system in which the sum of the resistances would be nil would be unstable but in practice this sum shows a slight excess of positive resistance, for avoiding instability.

In Fig. 2, 13 designates an amplifier with an amplification factor K and an internal output resistance $\rho$. 14, 15 are the output terminals across which the negative resistance appears; a feedback network, in series with respect to the output terminals, consists of a resistor 16 and a transformer 17. A feedback network, shunted across the output terminals, consists of a potentiometer 18 and a transformer 19.

Designating by $\beta$ the ratio of potentiometer 19 and by $\gamma$ the value of resistor 16 and the transformation ratio of transformers 17 and 19 being equal to unity, the internal impedance of such a device as seen from terminals 14, 15 has the following approximate value:

$$\rho'=\frac{\rho\pm K\gamma}{1\mp K\beta}$$

The transformers 17 and 19 provide a possible selection of the respective directions of the series and shunt feedbacks. Impedance $\rho'$ may be negative, either with a positive series feedback and a negative shunt feedback, or conversely.

Since such a device uses a mixed feedback, the value of $\rho'$ is very little affected by possible variations in the characteristics K and $\rho$ of the amplifier, as may be seen by writing the formula under the form:

$$\rho'=-\frac{\gamma}{\beta}\,\frac{1\mp\frac{1}{S\gamma}}{1\mp\frac{1}{K\beta}}$$

in which S is the overall slope of the amplifier. The upper signs are relative to a negative series feedback and a positive shunt feedback, the lower signs correspond to the converse situation; the terms which follow the + and − signs can easily be made negligible by using an amplifier with a sufficient amplification factor and a sufficient slope: the negative resistance developed becomes independent of the parameters of the tubes used; the circuit is thus stable and the desired object is obtained.

An embodiment is illustrated in Fig. 3 in which the negative resistance consists in a double amplifying triode 20, 20' in which the shunt feedback is positive and the series feedback is negative. Resistors 21, 22, 23 determine the values of these feedbacks. A series negative feedback voltage obtained at the terminals of resistor 21 is transmitted through resistor 22 and condenser 24 to the grid of tube 20. A positive shunt feedback voltage is obtained at the terminals of resistor 22, which is part of a potentiometer consisting of resistors 22 and 23, and such a voltage is also applied through condenser 24 to the grid of tube 20. Secondary effects occur, which are not taken into account here.

With such a device, using usual tubes, an amplification factor $K=300$ can easily be obtained with an internal output resistance $\rho=50,000$ ohms, which corresponds to a slops $S=6.10^{-3}$ amp./volt.

With a potentiometer ratio $$\frac{22}{22+23}$$

equalling ½, and with resistance 21 equalling 1,500 ohms, the above formula leads to $\rho'=3,000$ ohms, such a value being obtained without any difficulty in practice.

While I have described my invention in certain of its preferred embodiments, I realize that modifications may be made and I desire that it be understood that no limitations upon my invention are intended other than may be imposed by the scope of the appended claims.

What I claim is:

1. In an electromagnetic equipment of the analog computor type, comprising a plurality of potentiometer elements having a given resistance and assembled in cascade, a double amplifying triode connected to provide a positive shunt feedback and a negative series feedback and connected across the terminals of each of said potentiometer elements, said triode having a resistance which is negative with respect to the electric resistance of the element across the terminals of which it is connected and substantially equal thereto in absolute value.

2. In an electromagnetic equipment of the analog computor type, comprising a plurality of potentiometer elements having a given amplifying resistance and assembled in cascade, a double amplifying triode connected to provide a positive shunt feedback and a negative series feedback and connected across the terminals of each of said potentiometer elements, said triode having a resistance which is negative with respect to the electric resistance of the element across the terminals of which it is connected and substantially equal thereto in absolute value, and its amplification factor and overall slope having high enough values for the negative resistance to be independent of the parameters of the two triodes constituting the said double triode.

3. In an electromagnetic equipment of the analog computor type, comprising a plurality of potentiometer elements having a given resistance and assembled in cascade, an amplifier including a double amplifying triode having pairs of cathodes, grids and plates and connected across the terminals of each of said potentiometer elements, to provide a resistance which is negative with respect to the electric resistance of the element across the terminals of which it is connected and substantially equal thereto in absolute value, the plates of each triode being connected with the positive terminal of a suitable high voltage source, the cathodes and grids of both triodes being grounded through a suitable resistance, the plate of the first triode being connected capacitively with the grid of the second triode, the cathode of the second triode being connected with the grid of the first triode through a resistance and a capacity in series with said resistance, the mid-point of said capacity and resistance being connected with the plate of the second triode through a resistance, said amplifying triode having one working terminal grounded and the other working terminal connected with the plate of said second triode through a condenser.

No references cited.